US009168749B2

(12) United States Patent
Saito et al.

(10) Patent No.: US 9,168,749 B2
(45) Date of Patent: Oct. 27, 2015

(54) MANUFACTURING METHOD OF LIQUID DISCHARGE HEAD

(75) Inventors: Yoshikazu Saito, Inagi (JP); Hiroe Ishikura, Kawasaki (JP); Takumi Suzuki, Yokohama (JP); Tamaki Sato, Kawasaki (JP); Hirono Yoneyama, Naka-gun (JP); Masafumi Morisue, Tokyo (JP); Ryoji Kanri, Zushi (JP)

(73) Assignee: Canon Kabushiki Kaisha, Tokyo (JP)

( * ) Notice: Subject to any disclaimer, the term of this patent is extended or adjusted under 35 U.S.C. 154(b) by 1160 days.

(21) Appl. No.: 13/126,879

(22) PCT Filed: Dec. 2, 2009

(86) PCT No.: PCT/JP2009/070574

§ 371 (c)(1), (2), (4) Date: Apr. 29, 2011

(87) PCT Pub. No.: WO2010/071056

PCT Pub. Date: Jun. 24, 2010

(65) Prior Publication Data

US 2011/0206861 A1 Aug. 25, 2011

(30) Foreign Application Priority Data

Dec. 16, 2008 (JP) ................................ 2008-319640

(51) Int. Cl.
*C08F 2/46* (2006.01)
*B41J 2/16* (2006.01)

(52) U.S. Cl.
CPC .............. *B41J 2/1603* (2013.01); *B41J 2/1631* (2013.01); *B41J 2/1637* (2013.01)

(58) Field of Classification Search
CPC ....... B41J 2/1603; B41J 2/1631; B41J 2/1637
USPC ......................................................... 427/487
See application file for complete search history.

(56) References Cited

U.S. PATENT DOCUMENTS 5,478,606 A 12/1995 Ohkuma et al.
5,818,479 A 10/1998 Reinecke et al.

(Continued)

FOREIGN PATENT DOCUMENTS

JP 2003-100609 A 4/2003
JP 2005-186528 A 7/2005

(Continued)

OTHER PUBLICATIONS

Notification of and International Preliminary Report on Patentability issued Jun. 21, 2011, in counterpart International Application No. PCT/JP2009/070574.

*Primary Examiner* — Robert S Walters, Jr.
(74) *Attorney, Agent, or Firm* — Fitzpatrick, Cella, Harper & Scinto

(57) ABSTRACT

This invention relates to a manufacturing method of a liquid discharge head comprising: forming an active energy ray-curable resin layer on a surface of a substrate on which discharge energy generating elements are formed, attaching a material permeable to active energy rays onto a surface of the active energy ray-curable resin layer, pressing against the material permeable to active energy rays, a master mold being transparent to the active energy rays and having protrusions corresponding to a pattern of discharge ports so as to transfer the protrusions to the material permeable to active energy rays, selectively irradiating the active energy ray-curable resin layer with active energy rays according to a pattern of liquid flow paths so as to cure the active energy ray-curable resin layer, removing the master mold, and removing uncured portions of the active energy ray-curable resin layer.

10 Claims, 3 Drawing Sheets

(56) References Cited

U.S. PATENT DOCUMENTS

| | | | |
|---|---|---|---|
| 6,041,501 | A | 3/2000 | Suzuki et al. |
| 6,137,510 | A | 10/2000 | Sato et al. |
| 6,241,335 | B1 | 6/2001 | Suzuki |
| 6,811,715 | B2 | 11/2004 | Suzuki |
| 7,389,585 | B2 | 6/2008 | Sato et al. |
| 7,485,412 | B2 | 2/2009 | Okano et al. |
| 7,513,601 | B2 | 4/2009 | Asai et al. |
| 7,629,111 | B2 | 12/2009 | Kubota et al. |
| 7,789,490 | B2 | 9/2010 | Saito et al. |
| 7,810,904 | B2 | 10/2010 | Hino et al. |
| 7,854,065 | B2 | 12/2010 | Saito et al. |
| 2006/0277755 | A1 | 12/2006 | Kubota et al. |
| 2007/0252872 | A1 | 11/2007 | Fujii et al. |
| 2008/0227035 | A1 | 9/2008 | Kanri et al. |
| 2009/0133256 | A1 | 5/2009 | Okano et al. |
| 2009/0136875 | A1 | 5/2009 | Kubota et al. |
| 2009/0162797 | A1 | 6/2009 | Tsuji et al. |
| 2009/0167812 | A1 | 7/2009 | Asai et al. |
| 2009/0229125 | A1 | 9/2009 | Kato et al. |
| 2010/0310990 | A1 | 12/2010 | Sato |

FOREIGN PATENT DOCUMENTS

| | | | |
|---|---|---|---|
| JP | 2006-198779 | A | 8/2006 |
| JP | 2006-218736 | A | 8/2006 |
| JP | 2006-315321 | A | 11/2006 |
| JP | 2007-176076 | A | 7/2007 |
| JP | 2007-210115 | A | 8/2007 |

MANUFACTURING METHOD OF LIQUID DISCHARGE HEAD

TECHNICAL FIELD

The present invention relates to a forming method of a structure and a manufacturing method of an inkjet head.

BACKGROUND ART

There have been disclosed manufacturing methods of an inkjet recording head using nano-imprinting lithography and similar techniques, which are described in Japanese Patent Application Laid-Open No. 2006-198779, Japanese Patent Application Laid-Open No. 2007-176076, and U.S. Pat. No. 5,818,479.

Japanese Patent Application Laid-Open No. 2006-198779 discusses a manufacturing method of an inkjet recording head, in which firstly, a resin film and a mold member (master mold) having protrusions are heated, and the resin film is pressed against the mold member to form through-holes in the resin film. Subsequently, the resin film is laminated, as an orifice plate, onto a substrate where ink discharge energy generating elements and an ink flow path are formed, thereby manufacturing an inkjet recording head.

Japanese Patent Application Laid-Open No. 2007-176076 discusses a manufacturing method of an inkjet recording head, in which firstly, a master mold having protrusions is pressed against a substrate on which surface two types of resin are laminated to the extent that the protrusions of the master mold penetrate an upper layer resin to form through-holes in the resin constituting the upper layer. Subsequently, the resin forming the upper-layer is laminated, as an orifice plate, onto a substrate where an ink flow path and ink discharge energy generating elements are formed, thereby manufacturing an inkjet recording head.

Further, U.S. Pat. No. 5,818,479 discusses a manufacturing method of an inkjet recording head, in which firstly, an insert (master mold) having protrusions corresponding to a pattern of an ink flow path and discharge ports are formed is pressed against a resin to thereby form an ink flow path and discharge ports in the resin. Subsequently, the resin is laminated onto a substrate on which surface ink discharge energy generating elements are formed, thereby manufacturing an inkjet recording head.

In the manufacturing method of an inkjet recording head described in Japanese Patent Application Laid-Open No. 2006-198779 and Japanese Patent Application Laid-Open No. 2007-176076, the thickness of an orifice plate is defined by the thickness of the resins, and thus it is easy to control the thickness of the orifice plate. Both of the methods, however, require a step of bonding the manufactured orifice plate to the substrate having the ink flow path wall and ink discharge energy generating elements manufactured by some method. In this bonding step, highly accurate control of registration is required for the ink discharge energy generating elements and ink flow path which are formed in the substrate to the ink discharge ports formed in the orifice plate.

Meanwhile, in the manufacturing method of an inkjet recording head described in U.S. Pat. No. 5,818,479, the orifice plate and the ink flow path are formed into one integral unit, and the accuracy of registration of the ink discharge ports and ink flow path is defined only by the mold. It is however essential to bond the orifice plate to the substrate having ink discharge energy generating elements. Accordingly, this manufacturing method has a problem similar to those of the manufacturing methods of an inkjet recording head described in Japanese Patent Application Laid-Open No. 2006-198779 and Japanese Patent Application Laid-Open No. 2007-176076.

DISCLOSURE OF THE INVENTION

In light of the above, an object of the present invention is to provide a manufacturing method of a liquid discharge head, which can manufacture a liquid discharge head having a liquid flow path excellently formed with good shape precision and discharge ports and hardly causing a variation in liquid discharge properties, with a smaller number of manufacturing steps.

One example of the present invention is a manufacturing method of a liquid discharge head which comprises discharge ports for discharging a liquid, discharge energy generating elements for discharging the liquid, and liquid flow paths which incorporate the discharge energy generating elements and communicate with the discharge ports, the manufacturing method comprising:

(A) forming an active energy ray-curable resin layer on a surface of a substrate on which the discharge energy generating elements are formed, (B) attaching a material permeable to active energy rays onto a surface of the active energy ray-curable resin layer, (C) pressing against the material permeable to active energy rays, a master mold being transparent to the active energy rays and having protrusions corresponding to a pattern of the discharge ports so as to transfer the protrusions to the material permeable to active energy rays, (D) selectively irradiating the active energy ray-curable resin layer with active energy rays according to a pattern of the liquid flow paths so as to cure the active energy ray-curable resin layer, (E) removing the master mold, and (F) removing uncured portions of the active energy ray-curable resin layer.

According to the present invention, it is possible to provide a manufacturing method of a liquid discharge head, which can manufacture a liquid discharge head having a liquid flow path excellently formed with good shape precision and discharge ports and hardly causing a variation in liquid discharge properties, with a smaller number of manufacturing steps.

Further features of the present invention will become apparent from the following description of exemplary embodiments with reference to the attached drawings.

BEST MODES FOR CARRYING OUT THE INVENTION

Hereinafter, exemplary embodiments of the present invention will be described with reference to drawings. In the following description, as application examples of exemplary embodiments of the present invention, an inkjet recording head will be exemplarily described, which however shall not be construed as limiting the scope of the present invention. The exemplary embodiments are also applicable to manufacturing of a bio-chip, liquid discharge heads for printing electronic circuits, and the like. As the liquid discharge head, there is also a head for manufacturing a color filter.

Figure 3:
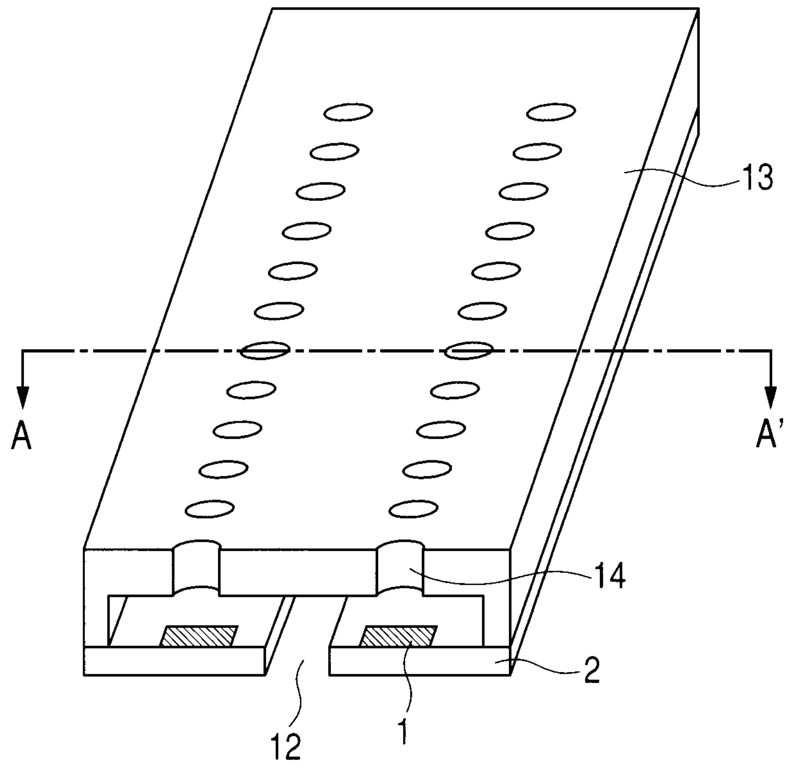
FIG. 3 is a cross-sectional perspective diagram illustrating an inkjet recording head manufactured by a manufacturing method of an inkjet recording head, to which the present invention is applicable.

FIG. 3 is a cross-sectional perspective diagram illustrating one example of an inkjet recording head to which the present invention is applicable. The illustrated inkjet recording head includes a substrate 2 on which surface ink discharge energy generating elements 1 are arranged in two rows having a predetermined pitch. In the substrate 2, an ink supply port 12 opens between the two rows of the ink discharge energy generating elements 1. On the substrate 2, there are formed ink discharge ports 14 which open up above each of the ink discharge energy generating elements 1 by an ink flow path wall-forming member 13, and individual ink flow paths each of which communicates from an ink supply port 12 to each of the ink discharge ports 14.

This inkjet recording head is arranged so that a surface with the ink supply port 12 formed thereon faces a recording surface of a recording medium. Then, this inkjet recording head discharges ink droplets from the ink discharge ports 14 by applying a pressure generated by the ink discharge energy generating elements 1 to an ink charged in the ink flow paths via the ink supply port 12. The discharged ink droplets are allowed to adhere to a recording medium to thereby perform recording.

This inkjet recording head can be mounted on apparatuses such as printers, copiers, facsimile machines and word processors having a printer section, and further on industrial recording apparatuses compositely combined with various processing apparatuses.

Next, manufacturing steps of a liquid discharge head according to the present invention will be described with reference to FIGS. 1A to 1E and 2A to 2E. Each of the drawings in FIGS. 1A to 1E and 2A to 2E illustrates a cross-sectional diagram along A-A' line in FIG. 3.

<Step (A)>

Figure 1A:
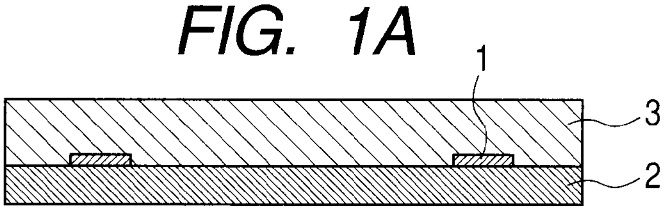
FIGS. 1A, 1B, 1C, 1D, and 1E are diagrams illustrating manufacturing steps of a manufacturing method of an inkjet recording head, to which the present invention is applicable.

Firstly, an active energy ray-curable resin layer 3 is formed on a substrate 2 having an ink discharge energy generating element 1 (FIG. 1A).

The ink discharge energy generating element 1 is an element generating energy for discharging ink. For example, electro-thermal converting elements and piezoelectric elements are used therefor. As the substrate 2, glass, ceramic, and metal are used, but material of the substrate is not limited thereto. Note that to the ink discharge energy generating element 1, electrodes (not illustrated) for control signal input for operating the ink discharge energy generating elements are connected. Further, with a view to improving the durability and the like, a protective layer may be formed on the ink discharge energy generating element. As the substrate, a silicon substrate is preferable because existing semiconductor manufacturing techniques can be readily used in the production of ink discharge energy generating elements and electrodes.

As a material (active energy ray-curable resin) for the active energy ray-curable resin layer 3, it is possible to use a resin which effects a polymerization reaction with active energy rays to cure. The polymerization reaction is not particularly limited. For example, radical polymerization reaction and cationic polymerization reaction are exemplified. As a material for the active energy ray-curable resin layer, negative type resists utilizing radical polymerization reaction or cationic polymerization reaction are exemplified; however, the material is not limited thereto, as long as it is capable of forming ink flow paths.

Negative type resists utilizing radical polymerization reaction are cured by the proceeding of polymerization or crosslinking between molecules of a radically polymerizable monomer or prepolymer contained in the resist, by radicals generated from a photopolymerization initiator contained in the resist. Examples of the photopolymerization initiator include benzoins, benzophenones, thioxanthones, anthraquinones, acylphosphine oxides, titanocenes, and acridines. As the radical-polymerizable monomer, monomers and prepolymers having an acryloyl group, methacryloyl group, acrylamide group, maleic acid diester or allyl group are suitable, but not limited thereto.

Negative type resists utilizing cationic polymerization reaction are cured by the proceeding of polymerization or crosslinking between molecules of a cationically polymerizable monomer or prepolymer contained in the resist, by cations generated from a photocationic initiator contained in the resist. Examples of the photocationic initiator include aromatic iodonium salts, and aromatic sulfonium salts. Specific examples thereof include trade name "ADEKA OPTOMER SP-170" and "ADEKA OPTOMER SP-150" produced by ADEKA Corp.; trade name "BBI-103" and "BBI-102" produced by Midori Kagaku Co., Ltd.; trade name "Rhodorsil Photoinitiator 2074" produced by Rhodia Inc.; and trade name "IBPF", "IBCF", "TS-01" and "TS-91" produced by Sanwa Chemical Co., Ltd. As the cationically polymerizable monomer and prepolymer, monomers and prepolymers having an epoxy group, vinylether group, oxetane group are suitable, but not limited thereto. Suitable examples of the monomers and prepolymers include bisphenol A epoxy resins, novolak epoxy resins, and bisphenol-novolak epoxy resins. More specifically, there may be exemplified alicyclic epoxy resins under the trade name of "ARON OXETANE OXT-121" produced by TOAGOSEI Co., Ltd.; and trade name of "CELLOXIDE2021", "GT-300 series", "GT-400 series" and "EHPE3150" produced by Daicel Chemical Industries, Ltd.

These monomers and prepolymers may be used alone or in combination. Further, additives may be added as required to the active energy ray-curable resin 3. For example, with a view to improving the adhesion with the substrate 2, a silane coupling agent or the like may be added to the active energy ray-curable resin 3. It is also possible to use commercially available negative type photoresists under the trade name of "SU-8 series" and "KMPR-1000" produced by MicroChem; and trade name of "TMMR S2000" and "TMMF S2000" produced by Tokyo Ohka Kogyo Co., Ltd.

As the forming method of the active energy ray-curable resin layer 3 (hereinbelow, otherwise abbreviated as "resin layer 3"), a suitable method can be selected from vapor deposition, spin-coating, laminating, spray coating, slit coating, etc., according to the resin used.

The height of the ink flow path in a finally obtained inkjet recording head is defined by the thickness of the resin layer 3, and therefore, it is possible to easily control the height of the ink flow path so as to be a desired size with uniformity and high-precision by controlling the thickness of the resin layer 3 in this step.

<Step (B)>

Figure 1B:
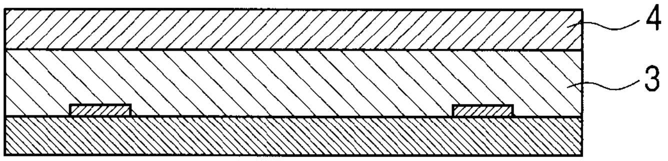
Figure 1C:
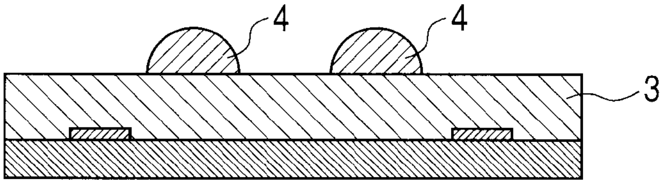

Next, an active energy ray-permeable material 4 (hereinafter, otherwise abbreviated as "material 4"), which is permeable to active energy rays, is adhered to a surface of the active energy ray-curable resin layer 3 (FIG. 1B or FIG. 1C).

The active energy ray-permeable material 4 may be a material, a part of which is permeable to active energy rays necessary for the active energy ray-curable resin layer 3 to cure. Examples of such materials are resins, glass, and ceramics. Among these, resins are preferable because they enable easy transferring of a pattern formed in a master mold and easy formation of ink discharge ports. Thermoplastic resins are particularly preferable because they are easily softened by heating, and enable further easy transferring of a pattern formed in a master mold. Specific examples of the thermoplastic resins include polyethylene (PE), polypropylene (PP), polystyrene (PS), acrylonitrile-styrene (AS) resin, acrylonitrile-butadiene-styrene (ABS) resin, polymethylmethacrylate (PMMA), polyvinyl chloride (PVC), polyvinylidene chloride (PVDC), polyamide (PA), polyacetal (POM), polyethylene terephthalate (PET), polybutylene terephthalate (PBT), polyethylene naphthalate (PEN), polymethyl pentene (TPX), polycarbonate (PC), modified polyphenylene ether (PPE), polysulfone (PSF), polyether sulfone (PES), polyarylate (PAR), polyetherimide (PIE), polyvinylidene fluoride (PVDF), ethylene-vinylacetate (EVA) resin, polyfluoroethylene-propylene (FEP) resin, polyallylsulfone (PASF), and polyether ether ketone (PEEK).

Also, as the active energy ray-permeable material, thermosetting resins are favorably used. In use of a thermosetting resin, it may be solid or viscous. Specific examples of the thermosetting resin include phenol resins, polyimide resins, urea resins, urethane resins, melamine resins, and epoxy resins. Especially, a resin composition containing a monomer or prepolymer having an epoxy group, vinylether group or oxetane group in combination with a catalyst curing agent polymerizing functional groups thereof is preferable, because the resin after curing is typically superior in ink resistance and mechanical properties. Suitable examples of the monomers and prepolymers include bisphenol-A epoxy resins, novolak epoxy resins, and bisphenol-novolak epoxy resins. More specifically, there may be exemplified alicyclic epoxy resins under the trade name of "ARON OXETANE OXT-121" produced by TOAGOSEI Co., Ltd.; and trade name of "CELLOXIDE 2021", "GT-300 series", "GT-400 series" and "EHPE3150" produced by Daicel Chemical Industries, Ltd. Suitable examples of the catalyst curing agent include benzylsulfonium salts, benzylammonium salts, and benzylphosphonium salts. More specifically, there may be exemplified thermocationic polymerization initiators under the trade name of "ADEKA OPTOMER CP-66" and "ADEKA OPTOMER CP-77" produced by ADEKA Corp.; and trade name of "SUNAID SI-60L", "SUNAID SI-80L" and "SUNAID SI-100L" produced by Sanshin Chemical Industry Co., Ltd.

These thermoplastic resins and thermosetting resins may be used alone or in combination. Further, additives may be added as required in an appropriate amount.

As the active energy ray-permeable material, it is possible to use commercially available resins for nanoimprinting, under the trade name of "mr-I7000 series", "mr-I8000 series" and "mr-I9000 series" produced by Micro Resist Technology; trade name of "NXR-1000 series" produced by Nanonex Corp. In addition, it is also possible to use spin-on-glass (SOG) materials described in Japanese Patent Application Laid-Open No. 2003-100609, hydrolysates of hydrolyzable organic silane compounds and/or partially condensed products thereof.

As a unit for attaching the active energy ray-permeable material onto a surface of the active energy ray-curable resin layer, a suitable unit may be selected from among vapor deposition units, spin-coating units, plating units, laminating units, spray coating units, etc., according to the resin used. There is no need for the material 4 to entirely cover the surface of the resin layer 3 at this step, and as illustrated in FIG. 1C, the material 4 may be selectively adhered to an arbitrary position of the surface of the resin layer 3 using a dispenser, an inkjet head or the like.

<Step (C)>

Figure 1D:
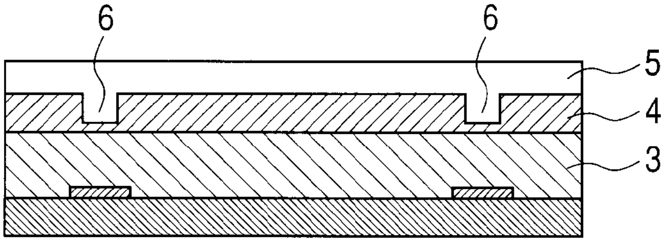
Figure 1E:
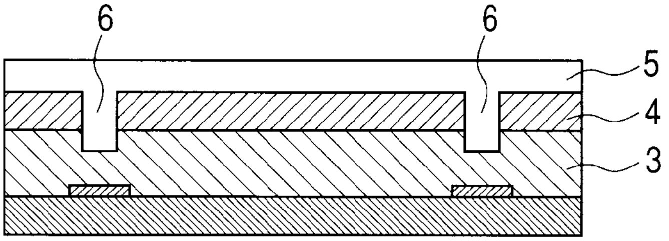

Next, an active energy ray-permeable master mold 5 (hereinbelow, otherwise abbreviated as "master mold 5"), which has protrusions 6 of a pattern of ink discharge ports and is permeable to active energy rays, is pressed against the material 4 to transfer impressions of the protrusions 6 to predetermined portions of the material 4 to form ink discharge ports (FIG. 1D or FIG. 1E).

The active energy ray-permeable master mold 5 may be a material, a part of which is permeable to active energy rays necessary for the active energy ray-curable resin layer 3 to cure. Examples of such materials are glass, quartz, and resins. In light of the durability of the master mold, a replica to which the protrusions are transferred from the master mold may be used as the master mold 5.

The pressure applied in the pressing master mold 5 against the material 4 may take a suitable value according to the physical properties of the material 4. The material 4 may be heated to be softened in view of reducing the pressure as necessary. In particular, when the material 4 is a thermoplastic resin, it is desired that the thermoplastic resin be heated to a temperature equal to or higher than the glass transition temperature thereof and then the master mold 5 be pressed against the thermoplastic resin. When the material 4 is viscous at normal temperature, it is favorable because the material can easily follow the shape of the master mold 5 even at normal temperature.

In the step of attaching the material 4 to a surface of the resin layer 3, when the material 4 is attached to a part of the surface of the resin layer 3, the material 4 is spread over the entire surface of the resin layer 3 in the process of pressing the master mold 5 against the material 4.

When the material 4 is a thermosetting resin, the master mold 5 is pressed against the material 4, and then the material 4 is heated to cure. This heating process is not necessarily carried out immediately after the master mold 5 is pressed against the thermosetting resin and may be carried out before/after the individual steps described below or at a suitable timing in the manufacturing process.

Generally, film residues 11 may occur at bottom parts of concave portions which are formed by transfer of the protrusions 6 of the master mold 5 in the material 4. With view to preventing the occurrence of film residues at the bottom part of the ink discharge ports formed in the material 4, using a master mold provided with protrusions 6 having a sufficient height, the protrusions 6 are allowed to penetrate through the material 4 to reach halfway the height of the resin layer 3 at the time of pressing the master mold 5, as illustrated in FIG. 1E.

Also, with view to reducing the occurrence of pattern defects caused by air bubbles, etc., in a space between the material 4 and the master mold 5 at the time of pressing the master mold 5, the imprinting processes may be carried out in vacuum or under reduced pressure.

<Step (D)>

Figure 2A:
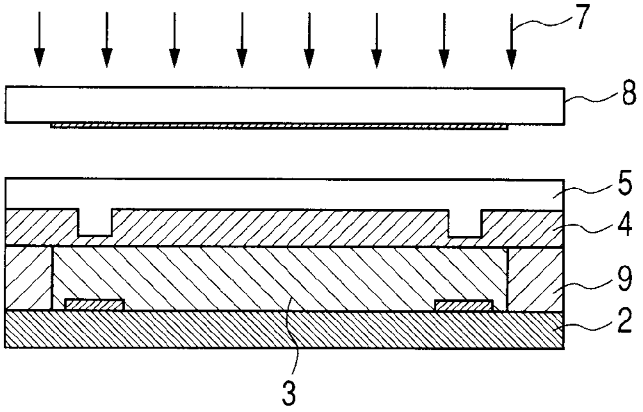
FIGS. 2A, 2B, 2C, 2D, and 2E are diagrams illustrating manufacturing steps of a manufacturing method of an inkjet recording head, to which the present invention is applicable.

Next, the active energy ray-curable resin layer 3 is selectively irradiated with active energy rays 7 according to a pattern of ink flow paths to cure the resin layer 3, so that an ink flow path wall 9 was produced (FIG. 2A).

The active energy rays 7 are not particularly limited as long as they are capable of curing the resin layer 3. Examples of the active energy rays include ultraviolet rays, visible light, infrared rays, X-rays, and γ-rays. Among these, ultraviolet rays are preferably used.

Figure 2B:
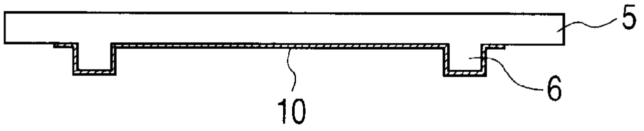

As a method of selectively irradiating the resin layer 3 with the active energy rays 7 according to the ink flow path pattern, for example, a method is exemplified in which the resin layer 3 is irradiated with the active energy rays 7 via a photomask 8 having a pattern of ink flow paths over the master mold 5. Also, it is preferred to use a master mold having a mechanism to shield active energy rays for the pattern of the ink flow paths. As illustrated in FIG. 2B, the master mold 5 may simultaneously serve as the photomask 8 by providing a shielding film 10 to shield the active energy rays 7 from the ink flow path pattern, on a surface of the master mold 5, the surface being provided with the protrusions 6 or the opposite surface of the master mold 5. In this case, favorably, it is unnecessary to every time perform registration of the ink discharge ports and the ink flow paths.

Further, when the resin layer 3 is a chemically-amplified negative type resist, with view to accelerating curing the resin layer 3, the resin layer 3 may be heated (post-exposure baked) after irradiation. The heating step is not necessarily carried out immediately after irradiation, and may be carried out after the step of removing the master mold 5 from the material 4, which will be described below. Furthermore, when the material 4 is a thermosetting resin, it is preferable because the post-exposure baking of the resin layer 3 can simultaneously serve as the heating step for curing the material 4 to thereby shorten the process time.

<Step (E)>

Figure 2C:
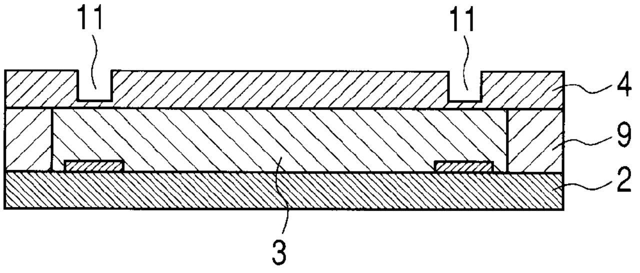

Next, the master mold 5 is removed from the material (FIG. 2C).

As a method of removing the master mold 5, there may be exemplified separation, dissolution, and fusion. However, since the master mold 5 can be used multiple times, separation is desired. Further, in the separation, in order to prevent a part of the material 4 and the resin layer 3 from adhering to the master mold 5, the master mold 5 may be subjected to releasing treatment, for example, a releasing agent is applied to a surface of the master mold 5 provided with the protrusions 6. Examples of the releasing agent include various fluorine-containing silane coupling agents such as 1H,1H,2H,2H-perfluorooctyltrichlorosilane, 1H,1H,2H,2H-perfluorodecyltrichlorosilane, 1H,1H,2H,2H-perfluorododecyltrichlorosilane, 1H,1H,2H,2H-perfluorooctyltrimethoxysilane, 1H,1H,2H,2H-perfluorodecyltrimethoxysilane, 1H,1H,2H,2H-perfluorododecyltrimethoxysilane, 1H,1H,2H,2H-perfluorooctyltriethoxysilane, 1H,1H,2H,2H-perfluorodecyltriethoxysilane, 1H,1H,2H,2H-perfluorododecyltriethoxysilane. More specifically, there may be exemplified OPTOOL series (trade name) produced by Daikin Industries Ltd., NOVEC EGC-1720 (trade name) produced by Sumitomo 3M Ltd., NANOS series (trade name) produced by T & K Inc., and diamond-like carbon (DLC). As a method of releasing treatment, a suitable method may be selected from dipping, spin-coating, slit coating, spray coating, and deposition, according to the releasing agent used.

When the material 4 is heated in the step of pressing the master mold 5 against the material 4, it is desired to remove the master mold 5 at a temperature equal to or lower than the glass transition temperature of the material 4 to prevent the ink discharge ports transferred to the material 4 from losing the shape.

Further, the film residues 11 occur at bottom parts of concave portions formed in the material 4 by transfer of the protrusions 6 of the master mold 5. When through holes are not formed in the material 4, after removal of the master mold 5, the generated film residues 11 are removed to expose the resin layer 3 outside. Examples of the step of removing the film residues 11 include dry-etching.

<Step (F)>

Figure 2D:
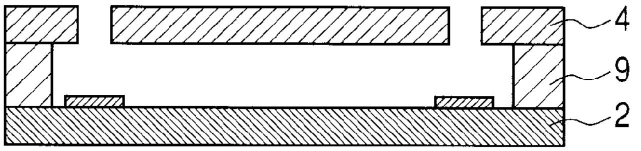

Next, uncured portions of the resin layer 3 not irradiated with active energy rays are removed to thereby form ink flow paths (FIG. 2D). As a method of removing uncured portions, a method is exemplified in which uncured portions are dissolved out by means of a solvent which does not dissolve cured portions but dissolves only uncured portions. If necessary, an ultrasonic wave radiation, etc., may be used in combination.

Also, between the above individual steps or at a suitable timing in the manufacturing process, ink supply port 12 for supplying an ink from an ink tank to the ink flow paths is formed on the substrate 2. As a method of forming the ink supply port 12, wet etching, dry etching, laser processing, and sand blasting are typically exemplified. The inkjet recording head may take a structure in which the ink supply port is formed on the material 4 instead of forming the ink supply port on the substrate 2 and an ink is supplied from the same surface where the ink discharge ports are formed.

Furthermore, an ink-repellant layer may be formed on the surface of an orifice plate. Formation of the ink-repellant layer may also be carried out between the above individual steps or at a suitable timing in the manufacturing process. As the ink repellant layer, any ink repellant layers known in the art may be used without particular limitation. For example, there is a fluorine-containing compound as the compound used for the ink repellant layer. For example, spin-coating, lamination, slit coating, lamination, spray coating, deposition, and plating are exemplified as the forming method of the ink repellant layer.

Figure 2E:
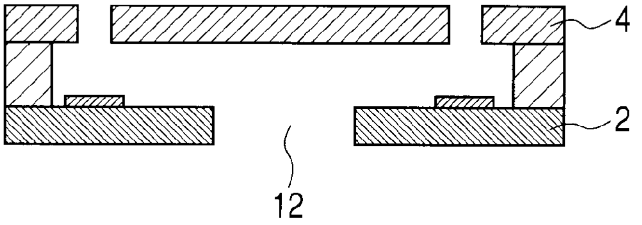

With the above procedures, an inkjet recording head can be obtained (FIG. 2E).

Note that the above description does not limit the order of steps or processes. For example, an inkjet recording head may be manufactured in the order of (A), (B), (D), (C), (E), and (F), and the manufacturing may proceed in the order of (A), (D), (B), (C), (E), and (F).

<Embodiment>

(Embodiment 1)

Manufacturing of Master Mold 1

Firstly, a positive type resist, OFPR-800 (trade name) produced by Tokyo Ohka Kogyo Co., Ltd., was applied onto a quartz substrate. The quartz substrate was exposed to light using a mask of an ink discharge port pattern, and then developed. Subsequently, the surface of the substrate was etched by reactive ion etching (RIE) using the pattern of OFPR-800 as a mask to produce protrusions of the ink discharge port pattern, and then the OFPR-800 was separated from the substrate. At that time, the height of the protrusions of the ink discharge port pattern was about 10 μm.

Subsequently, an aluminum (Al) film was formed, by thermochemical vapor deposition (CVD), on the surface of the quartz substrate where the protrusions were formed. The quartz substrate was heated to 300° C., and trimethylaluminum (TMA) was used as a source gas. The Al film was formed on not only end surfaces and bottom surface of the quartz substrate but also on side surfaces thereof.

Over the surface of the quartz substrate on which the Al film was formed, a positive type resist ODUR-1010 (trade name) produced by Tokyo Ohka Kogyo Co., Ltd., was applied. The Al film was prebaked at 120° C. for 6 minutes, and then exposed to light using the ink flow path pattern as a mask, so that the resist was patterned into ink flow paths. The Al film was developed with methylisobutylketone/xylene (=2/1), and then rinsed with xylene. The ODUR-1010 film after developing had a film thickness of about 20 μm. Afterward, the Al film was etched at exposed portions using a chlorine gas to remove the Al film in the exposed portions. Finally, the ODUR-1010 was removed according to the same procedure as in the above developing step to thereby prepare a master mold having an ultraviolet-ray shielding film on a surface thereof.

Subsequently, the master mold wad dipped in a releasing agent DURASURF HD-1101TH (trade name) produced by Harves Co., Ltd., and left to stand at room temperature for 24 hours. Afterward, the master mold was rinsed with NOVEC HFE-7100 (trade name) produced by Sumitomo 3M Ltd. to thereby remove the excessive releasing agent.

(Embodiment 2)

Manufacturing of Inkjet Recording Head 1

Firstly, an ink supply port was formed in a rear surface of a silicon substrate on which surface electro-thermal converting elements were formed as ink discharge energy generating elements. Specifically, a cyclized rubber resist was applied, as a protective film, onto the surface of the silicon substrate where the electro-thermal converting elements were formed. Subsequently, a silicon oxide which had been preliminarily formed on the rear surface of the silicon substrate was patterned, and using the patterned silicon oxide as a mask, the silicon substrate was immersed in a tetramethylammonium hydroxide aqueous solution (22%, 83° C.) for 16 hours. Then, the silicon substrate was subjected to anisotropic etching to form an ink supply port, and then the protective film was separated from the silicon substrate.

Next, SU-8 3025 (trade name) produced by MicroChem serving as a cationically photocurable resin was formed on a PET film by slit coating to form a cationically photocurable resin film. Then, the PET film was baked on a hot plate at 90° C. Then, the substrate having the ink supply port formed on its surface was heated on a hot plate at 40° C., and the cationically photocurable resin film formed on the PET film was laminated, using a hand-roller, on the surface of the substrate on which the electro-thermal converting elements were formed.

Next, the resin composition of thermosetting resin as shown in Table 1 was dissolved in a methylisobutylketone solvent at a concentration of 55 parts by weight, and a thermosetting resin film was formed on a PET film by slit coating. Then, the PET film was left to stand in a pressure-reduced chamber.

TABLE 1

| | | | |
|---|---|---|---|
| Epoxy resin | jER157S70 | Produced by Japan Epoxy Resin Co., Ltd. | 100 parts by weight |
| Thermal polymerization initiator | CP-77 | Produced by ADEKA Corp. | 2 parts by weight |

Next, the substrate on which surface the cationically photocurable resin film had been formed was heated on a hot plate at 40° C., and the thermosetting resin film formed on the PET film was laminated on a surface of the cationically photocurable resin using a hand roller. The cationically photocurable resin layer after lamination had a film thickness of about 12 μm, and the thermosetting resin layer after lamination had a film thickness of 5 μm.

Subsequently, the protrusions of the ink discharge port pattern were transferred to a surface of the thermosetting resin using the master mold prepared in Embodiment 1. More specifically, the substrate was heated to 100° C., and the master mold was pressed against the substrate surface at a pressure of 10 MPa. Then, the substrate was irradiated with an ultraviolet ray from above the master mold while heating at 100° C., and the cationically photocurable resin layer was exposed using, as a mask, the Al film formed on the master mold so that the cationically photocurable resin layer was patterned into ink flow paths. Further, the cationically photocurable resin layer was post-exposure baked to cure the thermosetting resin layer in a state of the substrate being pressed against the master mold, while maintaining the temperature at 100° C. for 4 minutes.

Next, the master mold was detached from the thermosetting resin. The protrusions of the master mold penetrated through the thermosetting resin of the upper layer to reach the cationically photocurable resin of the under layer.

Subsequently, the substrate was immersed in a methylisobutylketone/xylene (=2/3) liquid to dissolve and remove unexposed portions of the cationically photocurable resin layer to thereby form an ink flow path.

Then, to completely cure the cationically photocurable resin layer and thermosetting resin, the substrate was heated at 200° C. for 1 hour, and finally an ink supply member was bonded to the ink supply port, thereby completing an inkjet recording head.

(Embodiment 3)

Manufacturing of Master Mold 2

Firstly, a positive type resist, OFPR-800 (trade name) produced by Tokyo Ohka Kogyo Co., Ltd., was applied onto a quartz substrate. The quartz substrate was exposed to light using a mask of an ink discharge port pattern, and then developed. Subsequently, the surface of the substrate was etched by reactive ion etching (RIE) using the pattern of OFPR-800 as a mask to produce protrusions of the ink discharge port pattern, and then the OFPR-800 was separated from the substrate. At that time, the height of protrusions of the ink discharge port pattern was about 10 μm.

(Embodiment 4)

Manufacturing of Inkjet Recording Head 2

The manufacturing procedure of Embodiment 2 was repeated up to the step where an ink supply port was formed in the silicon substrate on which surface the electro-thermal converting elements were formed as the ink discharge energy generating elements, and a cationically photocurable resin layer and a thermosetting resin layer were formed over the silicon substrate.

Next, the protrusions of the ink discharge port pattern were transferred to a surface of the thermosetting resin using the master mold prepared in Embodiment 3. More specifically, the substrate was heated to 100° C., and the master mold was pressed against the substrate surface at a pressure of 10 MPa. The substrate was cooled to normal temperature and then detached from the thermosetting resin. The protrusions of the master mold penetrated through the thermosetting resin of the upper layer to reach the cationically photocurable resin of the under layer.

Subsequently, a mask having an ink flow path pattern was prepared, and the cationically photocurable resin layer was exposed to light using a mask aligner, MPA-600 SUPER (trade name) produced by Canon Inc., so that the cationically photocurable resin layer was patterned into ink flow paths. Afterward, the substrate was heated at 95° C. for 4 minutes, the cationically photocurable resin layer was post-exposure baked, and the thermosetting resin layer was cured.

Subsequently, the substrate was immersed in a methylisobutylketone/xylene (=2/3) liquid to dissolve and remove unexposed portions of the cationically photocurable resin layer to thereby form an ink flow path.

Then, to completely cure the cationically photocurable resin layer and thermosetting resin, the substrate was heated at 200° C. for 1 hour, and finally an ink supply member was bonded to the ink supply port, thereby manufacturing an inkjet recording head.

(Embodiment 5)

Manufacturing of Inkjet Recording Head 3

The manufacturing procedure of Embodiment 2 was repeated up to the step where an ink supply port was formed in the silicon substrate on which surface the electro-thermal converting elements were formed as the ink discharge energy generating elements, and a cationically photocurable resin layer and a thermosetting resin layer were formed over the silicon substrate.

Subsequently, a mask having an ink flow path pattern was prepared, and the cationically photocurable resin layer was exposed to light using a mask aligner, MPA-600 SUPER (trade name) produced by Canon Inc., so that the cationically photocurable resin layer was patterned into ink flow paths.

Next, the protrusions of the ink discharge port pattern were transferred to a surface of the thermosetting resin using the master mold prepared in Embodiment 3. More specifically, the substrate was heated to 100° C., and the master mold was pressed against the substrate surface at a pressure of 10 MPa. Further, the cationically photocurable resin layer was post-exposure baked and the thermosetting resin layer was cured in a state of the substrate being pressed against the master mold, while maintaining the temperature at 100° C. for 4 minutes.

Next, the master mold was detached from the thermosetting resin. The protrusions of the master mold penetrated through the thermosetting resin of the upper layer to reach the cationically photocurable resin of the under layer.

Subsequently, the substrate was immersed in a methylisobutylketone/xylene (=2/3) liquid to dissolve and remove unexposed portions of the cationically photocurable resin layer to thereby form an ink flow path.

Then, to completely cure the cationically photocurable resin layer and thermosetting resin, the substrate was heated at 200° C. for 1 hour, and finally an ink supply member was bonded to the ink supply port, thereby completing an inkjet recording head.

(Embodiment 6)

Manufacturing of Inkjet Recording Head 4

Firstly, an ink supply port was formed in a rear surface of a silicon substrate on which surface electro-thermal converting elements were formed as ink discharge energy generating elements. Specifically, a cyclized rubber resist was applied, as a protective film, onto the surface of the silicon substrate where the electro-thermal converting elements were formed. Subsequently, a silicon oxide which had been preliminarily formed on the rear surface of the silicon substrate was patterned, and using the patterned silicon oxide as a mask, the silicon substrate was immersed in a tetramethylammonium hydroxide aqueous solution (22%, 83° C.) for 16 hours. Then, the silicon substrate was subjected to anisotropic etching to form an ink supply port, and then the protective film was separated from the silicon substrate.

Next, SU-8 3025 (trade name) produced by MicroChem serving as a cationically photocurable resin was formed on a PET film by slit coating to form a cationically photocurable resin film. Then, the PET film was baked on a hot plate at 90° C. Then, the substrate having the ink supply port formed on its surface was heated on a hot plate at 40° C., and the cationically photocurable resin film formed on the PET film was laminated, using a hand-roller, on the surface of the substrate on which the electro-thermal converting elements were formed.

Subsequently, a mask having an ink flow path pattern was prepared, and the cationically photocurable resin layer was exposed to light using a mask aligner, MPA-600 SUPER (trade name) produced by Canon Inc., so that the cationically photocurable resin layer was patterned into ink flow paths.

Next, the resin composition of thermosetting resin shown in Table 1 was dissolved in a methylisobutylketone solvent at a concentration of 55 parts by weight, and a thermosetting resin film was formed on a PET film by slit coating. Then, the PET film was left to stand in a pressure-reduced chamber.

Next, the substrate on which surface the cationically photocurable resin film had been formed was heated on a hot plate at 40° C., and the thermosetting resin film formed on the PET film was laminated on a surface of the cationically photocurable resin using a hand roller. The cationically photocurable resin layer after lamination had a film thickness of about 15 μm, and the thermosetting resin layer after lamination had a film thickness of 10 μm.

Subsequently, the protrusions of the ink discharge port pattern were transferred to a surface of the thermosetting resin using the master mold prepared in Embodiment 3. More specifically, the substrate was heated to 100° C., and the master mold was pressed against the substrate surface at a pressure of 10 MPa. Then, the cationically photocurable resin layer was post-exposure baked and the thermosetting resin layer was cured in a state of the substrate being pressed against the master mold, while maintaining the temperature at 100° C. for 4 minutes.

Next, the master mold was detached from the thermosetting resin. Film residues were observed at bottom surfaces of concave structures formed in the thermosetting resin. Subsequently, the thermosetting resin was etched by reactive ion etching (RIE) in the presence of oxygen to remove the film residues at the bottom surfaces.

Subsequently, the substrate was immersed in a methylisobutylketone/xylene (=2/3) liquid to dissolve and remove unexposed portions of the cationically photocurable resin layer to thereby form ink flow paths.

Then, to completely cure the cationically photocurable resin layer and thermosetting resin, the substrate was heated at 200° C. for 1 hour, and finally an ink supply member was bonded to the ink supply port, thereby completing an inkjet recording head.

This application claims the benefit of Japanese Patent Application No. 2008-319640, filed on Dec. 16, 2008, which is hereby incorporated by reference herein in its entirety.

The invention claimed is:

1. A manufacturing method of a liquid discharge head which comprises discharge ports for discharging a liquid, discharge energy generating elements for discharging the liquid, and liquid flow paths which incorporate the discharge energy generating elements and communicate with the discharge ports, the manufacturing method comprising:

(A) forming an active energy ray-curable resin layer on a surface of a substrate on which the discharge energy generating elements are formed, (B) attaching a material permeable to active energy rays onto a surface of the active energy ray-curable resin layer, (C) pressing a master mold against the material permeable to active energy rays, the master mold including a material that is transparent to the active energy rays and having protrusions corresponding to a pattern of the discharge ports so as to impart impressions of the protrusions to the material permeable to active energy rays, (D) selectively irradiating the active energy ray-curable resin layer with active energy rays according to a pattern of the liquid flow paths so as to cure the active energy ray-curable resin layer, (E) removing the master mold, and (F) removing uncured portions of the active energy ray-curable resin layer.

2. The manufacturing method according to claim 1, wherein the master mold includes a mechanism to shield active energy rays in the pattern of the liquid flow paths; and in the step (D), a surface of the master mold opposing a surface of the master mold provided with the protrusions is irradiated with the active energy rays, and the mechanism to shield active energy rays shields the active energy rays to selectively irradiate the active energy ray-curable resin layer according to the pattern of the liquid flow paths with active energy rays.

3. The manufacturing method according to claim 1, wherein the material permeable to active energy rays is a thermoplastic resin, and in the step (C), the thermoplastic resin is heated to a temperature equal to or higher than the glass transition temperature of the thermoplastic resin, and the master mold is pressed against the thermoplastic resin.

4. The manufacturing method according to claim 1, wherein the material permeable to active energy rays is a thermosetting resin, and after the step (C), the thermosetting resin is heated to cure.

5. The manufacturing method according to claim 1, wherein the material permeable to active energy rays contains a hydrolysate of a hydrolyzable organic silane compound and/or a partially condensed product of the hydrolysate.

6. The manufacturing method according to claim 1, further comprising exposing the active energy ray-curable resin layer from bottom surfaces of concave structures which are formed by imparting impressions of the protrusions of the master mold to the surface of the material permeable to active energy rays, after the step (E).

7. The manufacturing method according to claim 6, wherein the exposing the active energy ray-curable resin layer from the bottom surfaces of the concave structures comprises etching.

8. The manufacturing method according to claim 1, wherein in the step (C), ends of the protrusions of the master mold penetrate through the material permeable to active energy rays to reach the active energy ray-curable resin layer.

9. The manufacturing method according to claim 1, wherein in the step (B), the material permeable to active energy rays is formed as a layer on the surface of the active energy ray-curable resin layer.

10. The manufacturing method according to claim 1, wherein in the step (C), when the master mold is pressed against the material permeable to active energy rays, the material permeable to active energy rays is formed as a layer.

* * * * *